(12) United States Patent
Nehls

(10) Patent No.: US 12,508,994 B2
(45) Date of Patent: Dec. 30, 2025

(54) VEHICLES AND SYSTEMS FOR DETERMINING TAILGATE POSITION USING ACCELEROMETERS

(71) Applicant: Toyota Motor Engineering & Manufacturing North America, Inc., Plano, TX (US)

(72) Inventor: Scott P. Nehls, Ypsilanti, MI (US)

(73) Assignees: Toyota Motor Engineering & Manufacturing North America, Inc., Plano, TX (US); Toyota Jidosha Kabushiki Kaisha, Toyota (JP)

( * ) Notice: Subject to any disclaimer, the term of this patent is extended or adjusted under 35 U.S.C. 154(b) by 153 days.

(21) Appl. No.: 18/113,317

(22) Filed: Feb. 23, 2023

(65) Prior Publication Data

US 2024/0286551 A1 Aug. 29, 2024

(51) Int. Cl.
*B60R 1/26* (2022.01)
*B60R 11/04* (2006.01)
*B62D 33/027* (2006.01)

(52) U.S. Cl.
CPC ............... *B60R 1/26* (2022.01); *B60R 11/04* (2013.01); *B62D 33/0273* (2013.01); *B60R 2300/80* (2013.01)

(58) Field of Classification Search
CPC ......... B60R 1/26; B60R 1/04; B60R 2300/80; B62D 33/0273
See application file for complete search history.

(56) References Cited

U.S. PATENT DOCUMENTS

| | | | |
|---|---|---|---|
| 8,830,317 B2 | 9/2014 | Meier | |
| 9,199,576 B2 | 12/2015 | Van Wiemeersch | |
| 10,214,156 B2 | 2/2019 | Moenig et al. | |
| 10,328,867 B2 | 6/2019 | Green | |
| 2018/0001820 A1* | 1/2018 | Higgins | B62D 33/0273 |
| 2018/0086283 A1* | 3/2018 | Green | B62D 33/0273 |
| 2019/0228235 A1* | 7/2019 | Murad | G06V 20/56 |
| 2019/0292833 A1* | 9/2019 | Lamm | E05F 15/70 |
| 2019/0299878 A1 | 10/2019 | Nishio et al. | |
| 2022/0163635 A1* | 5/2022 | Dunn | G01S 17/931 |

* cited by examiner

*Primary Examiner* — Kathleen V Nguyen
(74) *Attorney, Agent, or Firm* — Dinsmore & Shohl LLP

(57) ABSTRACT

A vehicle includes a vehicle body having a cabin area and a cargo area including a truck bed assembly. A tailgate assembly is pivotally connected to the truck bed assembly. The tailgate assembly is moveable between a raised configuration and a lowered configuration. A control unit includes logic that, when executed by a non-transitory processor, causes the processor to compare a first accelerometer signal from a first accelerometer mounted to the tailgate and another accelerometer signal from a second accelerometer located outside the tailgate to determine if the tailgate is in the raised configuration or the lowered configuration.

10 Claims, 4 Drawing Sheets

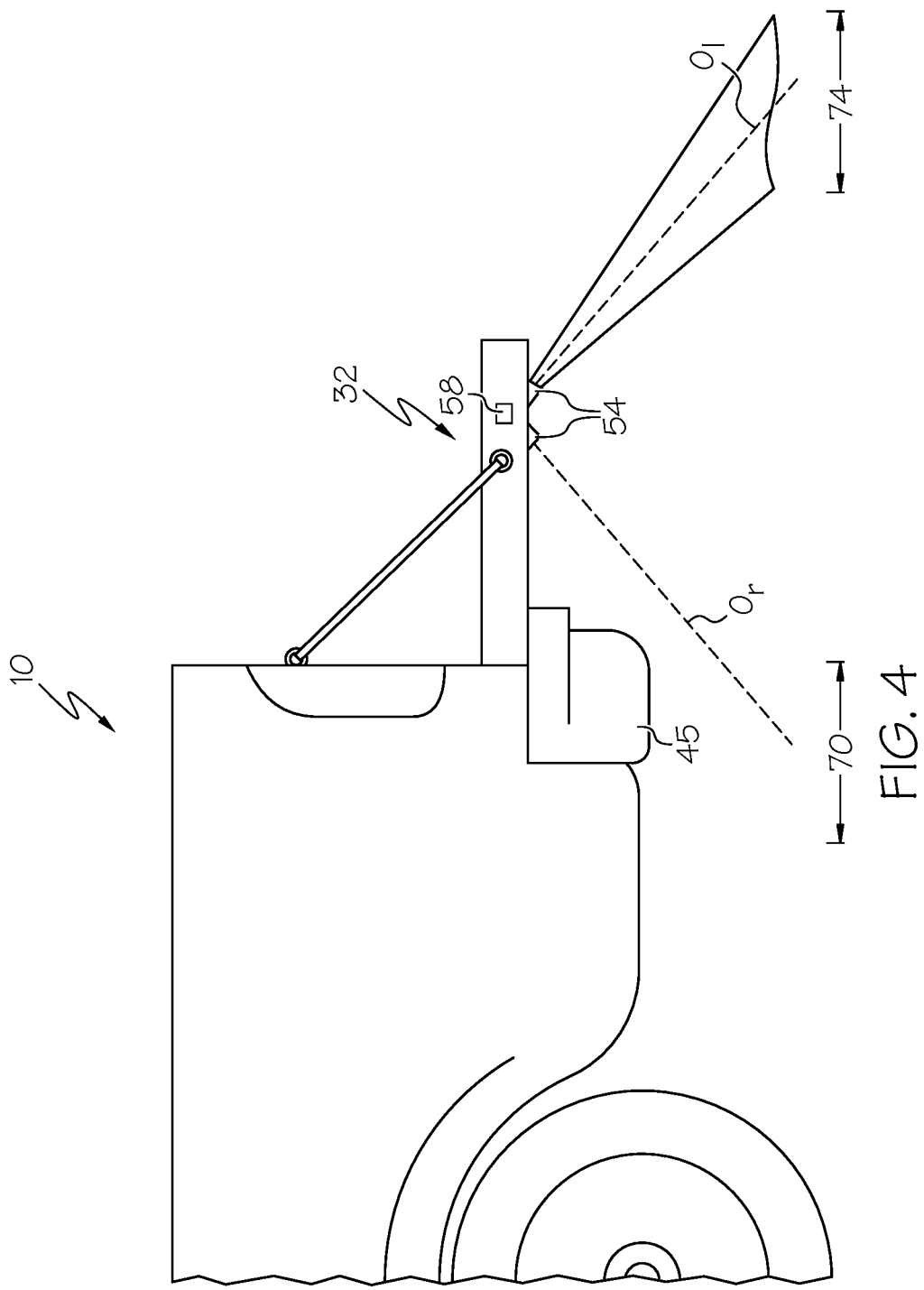

US 12,508,994 B2

VEHICLES AND SYSTEMS FOR DETERMINING TAILGATE POSITION USING ACCELEROMETERS

TECHNICAL FIELD

The present specification generally relates to vehicle tailgate camera systems and, more specifically, to vehicle and systems for determining tailgate position using accelerometers.

BACKGROUND

Load carrying vehicles, such as trucks, often have fold-down tailgates. Folded down, the tailgates extend the area of the truck bed. Folded up, the tailgates close off the truck bed. It is known to provide tailgates with restraining devices for controlling lowering of the tailgates. As one example, cables may be provided to limit rotation of the tailgates thereby setting the lowered position of the tailgates at horizontal. The cables may be attached to the tailgates at one end and attached to sidewalls of the truck body at opposite ends.

Some trucks have rear mounted video cameras to provide an image at a rear of the truck. However, the rear mounted cameras that are mounted to the tailgate, rotate with the tailgate between the raised and lowered configurations. This repositioning of the video camera can change the optical axis of the camera from pointing rearward, beyond the tailgate with the tailgate in the raised position to underneath and even forward of the tailgate with the tailgate in the lowered position.

Accordingly, a need exists for systems that can determine whether a tailgate is a raised or lowered configuration.

SUMMARY

In one embodiment, a vehicle includes a vehicle body having a cabin area and a cargo area including a truck bed assembly. A tailgate assembly is pivotally connected to the truck bed assembly. The tailgate assembly is moveable between a raised configuration and a lowered configuration. A control unit includes logic that, when executed by a non-transitory processor, causes the processor to compare a first accelerometer signal from a first accelerometer mounted to the tailgate and another accelerometer signal from a second accelerometer located outside the tailgate to determine if the tailgate is in the raised configuration or the lowered configuration.

In another embodiment, a method of providing different fields of view using a rear camera assembly mounted to a tailgate assembly of a vehicle is provided. The method includes comparing a first accelerometer signal from a first accelerometer located on the tailgate assembly to a second accelerometer signal from a second accelerometer mounted on the vehicle outside the tailgate assembly. It is determined if the tailgate assembly is in a raised configuration or a lowered configuration based on the step of comparing. A control unit changes a field of view of the rear camera assembly based on the step of determining.

These and additional features provided by the embodiments described herein will be more fully understood in view of the following detailed description, in conjunction with the drawings.

BRIEF DESCRIPTION OF THE DRAWINGS

The embodiments set forth in the drawings are illustrative and exemplary in nature and not intended to limit the subject matter defined by the claims. The following detailed description of the illustrative embodiments can be understood when read in conjunction with the following drawings, where like structure is indicated with like reference numerals and in which:

FIG. 4 is a side view of the vehicle of FIG. 1 with the tailgate assembly in a lowered configuration and the tailgate camera system in use, according to one or more embodiments shown and described herein.

DETAILED DESCRIPTION

Embodiments described herein are generally related to vehicles and methods utilizing vehicle video systems that include a rear mounted video camera apparatus that are capable of providing a back-up camera view with a vehicle tailgate assembly in either a raised configuration or a lowered configuration. The vehicles include a vehicle body having a cabin area and a cargo area including a truck bed assembly. A tailgate assembly is pivotally connected to the truck bed assembly at a location between a pair of tailgate posts. The tailgate assembly is moveable between a raised configuration and a lowered configuration. A control unit includes logic that, when executed by a non-transitory processor, causes a processor to compare a first accelerometer signal from a first accelerometer in the tailgate and another accelerometer signal from a second accelerometer located outside the tailgate to determine if the tailgate is in the lowered configuration.

Figure 1:
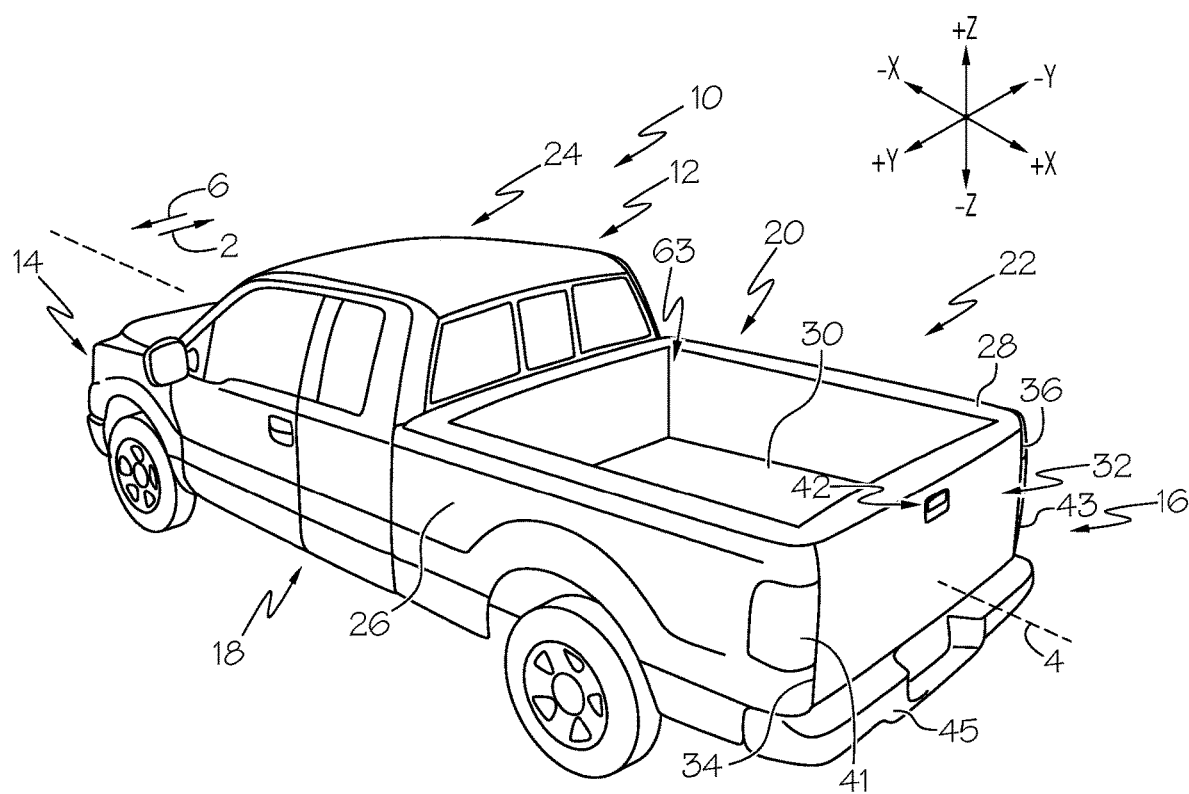
FIG. 1 is a perspective view of a vehicle including a tailgate camera system for determining whether a tailgate is in an open or closed configuration, according to one or more embodiments shown and described herein.

As used herein, the term "vehicle longitudinal direction" refers to the forward-rearward direction of the vehicle (i.e., in the +/− vehicle X-direction depicted in FIG. 1). The term "vehicle lateral direction" refers to the cross-vehicle direction (i.e., in the +/− vehicle Y-direction depicted in FIG. 1), and is transverse to the vehicle longitudinal direction. The term "vehicle vertical direction" refers to the upward-downward direction of the vehicle (i.e., in the +/− vehicle Z-direction depicted in FIG. 1). Further, the terms "inboard," "inward," "outboard" and "outward" are used to describe the relative positioning of various components of the vehicle. Referring to FIG. 1, the terms "outboard" or "outward" as used herein refers to the relative location of a component in direction 2 with respect to a vehicle centerline 4. The term "inboard" or "inward" as used herein refers to the relative location of a component in direction 6 with respect to the vehicle centerline 4. Because the vehicle structures may be generally symmetrical about the vehicle centerline 4, the direction to which use of terms "inboard," "inward," "outboard" and "outward" refer may be mirrored about the vehicle centerline 4 when evaluating components positioned along opposite sides of the vehicle 10.

Referring to FIG. 1, the vehicle 10 includes a vehicle body 12 having a front 14, a rear 16 and sides 18 and 20 that extend between the front 14 and the rear 16 in the vehicle longitudinal direction. In the illustrated embodiment, the vehicle 10 is a truck including a cargo area 22 that is formed rearward of a cabin area 24 by sidewalls 26 and 28, floor 30 and a tailgate assembly 32 that is located between tailgate posts 34 and 36. The tailgate posts 34 and 36 may include taillights 41 and 43 and latch components (e.g., strikers) that can releasably connect to the tailgate assembly 32 for releasably latching the tailgate assembly 32 in a raised configuration, as shown. The tailgate assembly 32 may include a tailgate handle assembly 42 that can be used to release the tailgate assembly 32 from the latch components in order to place the tailgate assembly 32 in a lowered position (represented by dashed lines). In the lowered position, the floor 30 may be extended outward beyond a vehicle rear bumper assembly 45 and increased access to the cargo area 22 can be provided. In some embodiments, the tailgate assembly 32 may be removable from the cargo area 22.

In an embodiment, the vehicle 10, in the form of the pickup truck, has the cargo area 22 with truck bed assembly 63 that includes the sidewalls 26 and 28, the tailgate posts 34 and 36 and the tailgate assembly 32 that can be moved between raised and lowered configurations. FIG. 1 illustrates the tailgate assembly 32 in the raised configuration, latched with the tailgate posts 34 and 36 that are fixed in their illustrated locations. The tailgate assembly 32 includes the tailgate handle assembly 42 that can be used to release the tailgate assembly 32 from latch components of the tailgate posts 34 and 36.

Figure 2:
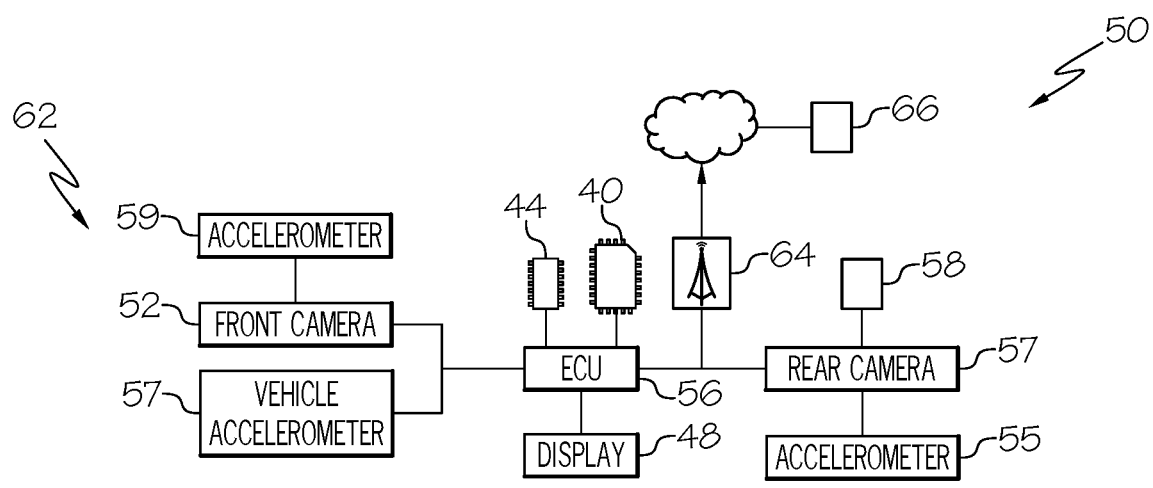
FIG. 2 is a schematic view of the system for determining whether a tailgate is in the raised or lowered configuration for use with the vehicle of FIG. 1, according to one or more embodiments shown and described herein.

Referring to FIG. 2, the vehicle 10 includes a vehicle video system 50 that includes one or more front video cameras 52 and one or more rear video cameras 54 that are connected to an electronic control unit 56 (ECU) that provides image processing and memory storage capabilities. The term "video" refers to a series of captured images within a FOV of the video camera. The vehicle video system 50 includes one or more processors 40. Each one or more processor 40 may be any non-transitory device capable of executing machine readable instructions. Accordingly, each one or more processor 40 may be a controller, an integrated circuit, a microchip, a computer, or any other computing device. The one or more processors 40 are coupled to a communication path C that provides signal interconnectivity between various modules. Accordingly, the communication path C may communicatively couple any number of processors 40 with one another, and allow the modules coupled to the communication path C to operate in a distributed computing environment. Specifically, each of the modules may operate as a node that may send and/or receive data. As used herein, the term "communicatively coupled" means that coupled components are capable of exchanging data signals with one another such as, for example, electrical signals via conductive medium, electromagnetic signals via air, optical signals via optical waveguides, and the like.

Accordingly, the communication path C may be formed from any medium that is capable of transmitting a signal such as, for example, conductive wires, conductive traces, optical waveguides, or the like. In some embodiments, the communication path C may facilitate the transmission of wireless signals, such as WiFi, Bluetooth, and the like. Moreover, the communication path C may be formed from a combination of mediums capable of transmitting signals. In one embodiment, the communication path C comprises a combination of conductive traces, conductive wires, connectors, and buses that cooperate to permit the transmission of electrical data signals to components such as processors, memories, sensors, input devices, output devices, and communication devices. Accordingly, the communication path C may comprise a vehicle bus, such as for example a LIN bus, a CAN bus, a VAN bus, and the like. Additionally, it is noted that the term "signal" means a waveform (e.g., electrical, optical, magnetic, mechanical or electromagnetic), such as DC, AC, sinusoidal-wave, triangular-wave, square-wave, vibration, and the like, capable of traveling through a medium.

The vehicle 10 further includes one or more memory modules 44 coupled to the communication path C. The one or more memory modules 44 may comprise RAM, ROM, flash memories, hard drives, or any device capable of storing machine readable instructions such that the machine readable instructions can be accessed by the one or more processors 40. The machine readable instructions may comprise logic or algorithm(s) written in any programming language of any generation (e.g., 1GL, 2GL, 3GL, 4GL, or 5GL) such as, for example, machine language that may be directly executed by the processor, or assembly language, object-oriented programming (OOP), scripting languages, microcode, etc., that may be compiled or assembled into machine readable instructions and stored on the one or more memory modules 44. Alternatively, the machine readable instructions may be written in a hardware description language (HDL), such as logic implemented via either a field-programmable gate array (FPGA) configuration or an application-specific integrated circuit (ASIC), or their equivalents. Accordingly, the methods described herein may be implemented in any suitable computer programming language, as pre-programmed hardware elements, or as a combination of hardware and software components.

In some embodiments, the one or more memory modules 44 may include a database that includes logic for comparing signals from accelerometers 55, 57 and 59. For example, the one or more memory modules 44 may include a database or algorithm to allow the vehicle 10 to compare signals from the accelerometers 55, 57 and 59 and determine whether the tailgate assembly 32 is in either of the raised or lowered configurations or some position in between. The vehicle system 50 may control operation of an actuator 58 that is operatively connected to the rear video camera 54 based on the comparison of the signals from the accelerometers 55, 57 and 59. The actuator 58 (e.g., a motor) may be operatively connected to the rear video camera 54 for moving the rear video camera 54 from a first position showing a first FOV to a second position showing a second FOV that each capture a predetermined area behind the vehicle 10 depending on whether the tailgate assembly 32 in in the raised configuration or the lowered configuration.

As used herein, an "accelerometer" is a device that measures acceleration, which is a change in velocity per unit of time. The accelerometers 55, 57 and 59 may be three-axis accelerometers that can provide a signal indicative of acceleration in any of the X, Y and Z directions that can be fixed for a particular accelerometer orientation (i.e., set for the particular accelerometer). As one example, the accelerometer 55 may be part of a rear vehicle camera assembly 60 that includes the rear video camera 54, the accelerometer 57 may be part of the vehicle 10 (e.g., used to measure acceleration of the vehicle) and located outside the tailgate assembly 32 and the accelerometer 59 may be part of a front camera assembly 62 that is also located outside the tailgate assembly 32. As can be appreciated, when comparing the accelerometer signal of the accelerometer 57 to one or both of the other accelerometers 57 and 59 that are in fixed positions relative to the vehicle body 12, the comparison results will change depending on if the tailgate assembly 32 in in the raised configuration or the lowered configuration as the orientation of the accelerometer 55 relative to gravity changes. For example, the accelerometers 55, 57 and 59 can be oriented and configured to provide the same acceleration output direction for gravitational acceleration if the tailgate assembly 32 is in the raised configuration and the accelerometer 55 provides a different acceleration output direction for gravitational acceleration than the accelerometers 57 and 59 if the tailgate assembly 32 is in the lowered configuration due to the rotation of the tailgate assembly 32 and change in orientation of the accelerometer 55.

Figure 3:
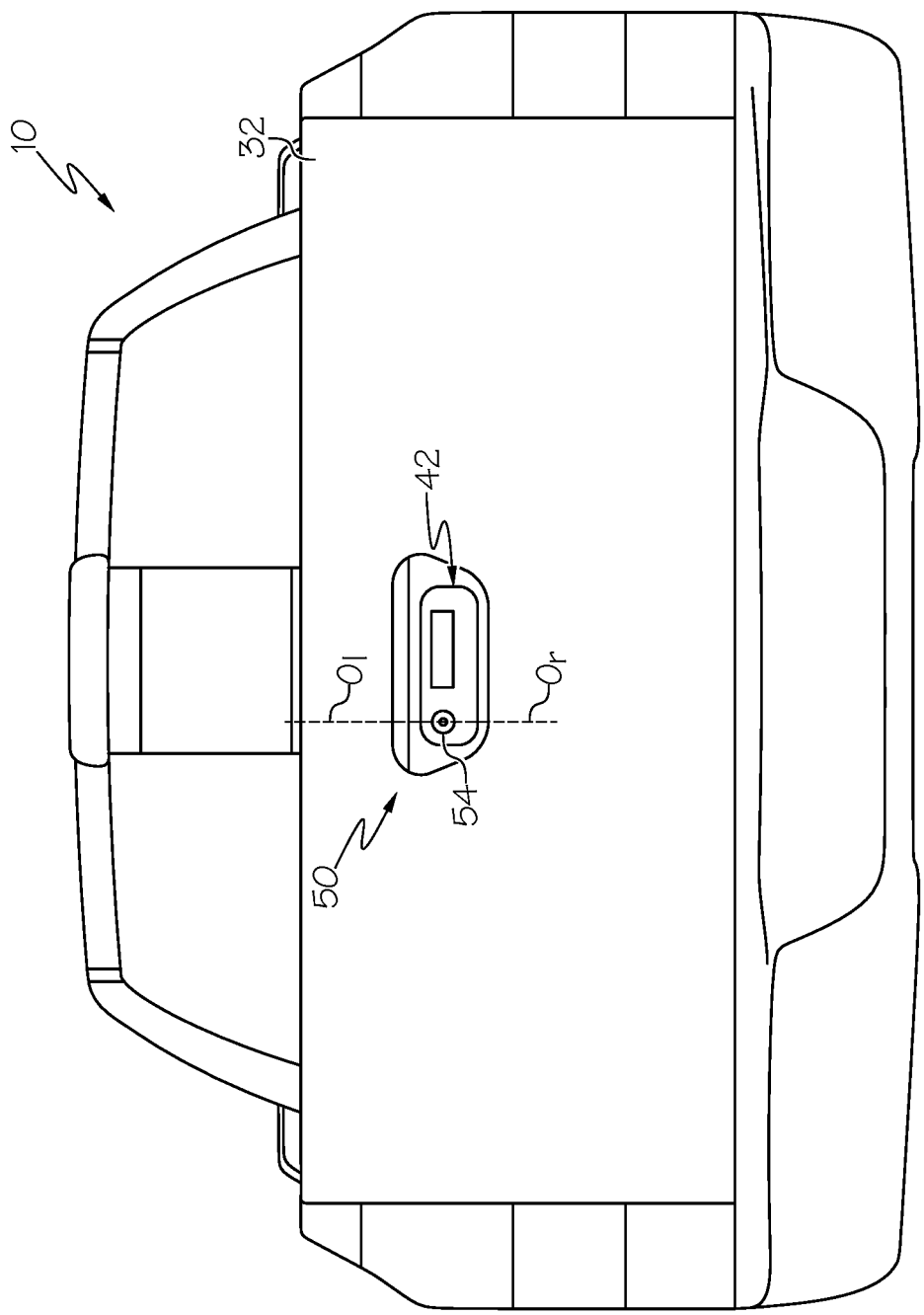
FIG. 3 is a rear view of the vehicle of FIG. 1 with a tailgate assembly in a raised configuration, according to one or more embodiments shown and described herein.

The vehicle 10 comprises a display 48 for providing visual output such as, for example, maps, navigation, entertainment, information, or a combination thereof. The display 48 is coupled to the communication path C, as shown in FIG. 3. Accordingly, the communication path C communicatively couples the display 48 to other modules of the vehicle 10. The display 48 may include any medium capable of transmitting an optical output such as, for example, a cathode ray tube, light emitting diodes, a liquid crystal display, a plasma display, or the like. Moreover, the display 48 may be a touch screen that, in addition to providing optical information, detects the presence and location of a tactile input upon a surface of or adjacent to the display 48. Accordingly, the display 48 may receive mechanical input directly upon the optical output provided by the display 48. The display 48 can be used to control operation of the vehicle video system 50 and display video signals provided from the rear and front video cameras 54 and 52. It is noted that the display 48 can include at least one of the one or more processors 40 and the one or memory modules 44. The display 48 can be at least one of a heads-up display, an instrument cluster display, and a mobile device display. In some embodiments, the vehicle 10 may have a plurality of displays. In such embodiments, the vehicle 10 can also have a plurality of different types of displays at various locations within the vehicle 10. For example, and not as a limitation, the vehicle 10 can have an in-dashboard display and a heads-up display for displaying information directly on a windshield or window of the vehicle 10.

In some embodiments, the vehicle 10 comprises network interface module 64 for communicatively coupling the vehicle 10 to a network. The network interface module 64 can be communicatively coupled to the communication path C and can be any device capable of transmitting and/or receiving data via the network. Accordingly, the network interface module 64 can include a communication transceiver for sending and/or receiving any wired or wireless communication. For example, the network interface module 64 may include an antenna, a modem, LAN port, Wi-Fi card, WiMax card, mobile communications hardware, near-field communication hardware, satellite communication hardware and/or any wired or wireless hardware for communicating with other networks and/or devices. In one embodiment, the network interface module 64 includes hardware configured to operate in accordance with the Bluetooth wireless communication protocol. In another embodiment, network interface module 64 may include a Bluetooth send/receive module for sending and receiving Bluetooth communications to/from a mobile device 66 (e.g., a smartphone including a virtual key) for controlling operation of and/or receiving information from the vehicle video system 50, such as if the tailgate assembly 32 is in the raised or lowered configuration.

The front video camera 52 and the rear video camera 54 may be coupled to the communication path C such that the communication path C communicatively couples the cameras 52 and 54 to other modules of the vehicle 10. The front video camera 52 and the rear video camera 54 may be any device having an array of sensing devices (e.g., pixels) capable of detecting radiation in an ultraviolet wavelength band, a visible light wavelength band, or an infrared wavelength band. The front video camera 52 and the rear video camera 54 may have any suitable resolution. In operation, the signal from the accelerometer 55 of the rear camera assembly 60 may be used by the processor 40 to determine whether the tailgate assembly 32 is in the raised or lowered configuration by comparing the signal to signals from one or both of the other accelerometers 57 and 59 provided due to the acceleration of gravity. In some embodiments, the rear camera assembly 60 may include the processor 40 to determine whether the tailgate assembly in in the raised and lowered configuration.

Referring to FIGS. 3 and 4, the vehicle video system 50 includes the rear video camera 54. The rear video camera 54 may have an optical axis $O_r$ that is directed generally downward in the vehicle vertical direction and rearward in the vehicle longitudinal direction with the tailgate assembly 32 in the raised configuration thereby providing a FOV 70 located rearward of the vehicle rear bumper assembly 45. In some embodiments, the FOV 70 of the rear video camera 54 may not capture the vehicle rear bumper assembly 45, but in other embodiments, at least a portion of the vehicle rear bumper assembly 45 is located in the FOV 70. As indicated above, the ECU 56 (FIG. 2) may determine that the tailgate assembly 32 is in the raised configuration and provide the FOV 70 upon a preselected camera activation event using the actuator 58 operatively connected to the rear video camera 54.

The rear video camera 54 may be associated with the tailgate handle assembly 42. The rear video camera 54 has an optical axis $O_l$ that is offset from the optical axis $O_r$ such that the optical axis $O_l$ is directed generally downward in the vehicle vertical direction and rearward in the vehicle longitudinal direction thereby providing a FOV 74 that is located rearward of the tailgate assembly 32 with the tailgate assembly 32 in the lowered configuration. As can be seen, the FOV 74 provided by the rear tailgate camera 54 is different from the FOV 70. In particular, the FOV 74 of the rear video camera 54 with the tailgate assembly 32 in the lowered configuration is located at least partially rearward of the FOV 70 with the tailgate assembly 32 in the raised configuration. Such an arrangement can allow the rear video camera 54 to provide the FOV 74 rearward of the tailgate assembly 32, for example, during a reverse driving operation. As indicated above, the ECU 56 (FIG. 2) may determine that the tailgate assembly 32 is in the lowered configuration and provide the FOV 74 upon a preselected camera activation event using the actuator 58 operatively connected to the rear video camera 54. In some embodiments, the rear video camera 54 may be configured to provide the multiple FOVs using, for example, a lens system that includes multiple lenses without the use of actuator 58. In some embodiments, the vehicle video system 50 may switch between multiple cameras mounted on the tailgate to provide the different FOVs.

The above-described vehicle video systems provide one or more rear tailgate video cameras that can be used to provide a suitable FOV with tailgate assemblies in both raised and lowered configurations. The vehicle video systems utilize both a fixed accelerometer (e.g., a vehicle accelerometer and/or a front camera accelerometer) and a movable accelerometer that moves with the tailgate assembly (e.g., a rear camera accelerometer), comparing the signals provided therefrom to determine whether the tailgate assembly is in the raised or lowered configuration. In the raised configuration of the tailgate assembly, the vehicle video system provides a first FOV and in a lowered configuration of the tailgate assembly, the vehicle video systems provide a second FOV that is different from the first FOV. Such arrangements can provide suitable FOVs for the driver, even when driving with the tailgate assembly in the lowered configuration using only a single camera or even multiple cameras mounted on the tailgate.

While particular embodiments have been illustrated and described herein, it should be understood that various other changes and modifications may be made without departing from the spirit and scope of the claimed subject matter. Moreover, although various aspects of the claimed subject matter have been described herein, such aspects need not be utilized in combination. It is therefore intended that the appended claims cover all such changes and modifications that are within the scope of the claimed subject matter.

What is claimed is:

1. A vehicle comprising:
   a vehicle body having a cabin area and a cargo area including a truck bed assembly;
   a tailgate assembly that is pivotally connected to the truck bed assembly, the tailgate assembly being moveable between a raised configuration and a lowered configuration; and
   a control unit includes logic that, when executed by a non-transitory processor, causes the processor to compare a first accelerometer signal from a first accelerometer mounted to the tailgate and another accelerometer signal from a second accelerometer located outside the tailgate to determine if the tailgate is in the raised configuration or the lowered configuration and adjust a field of view of a rear camera assembly as part of a reverse driving operation;
   wherein the first accelerometer and second accelerometer are arranged and configured to provide a same accelerometer signal output direction for gravitational acceleration when the tailgate assembly in in the raised configuration and the first accelerometer provides a different acceleration output direction for gravitational acceleration than the second accelerometer when the tailgate assembly is in the lowered configuration due to change in orientation of the first accelerometer.

2. The vehicle of claim 1 further comprising a third accelerometer located outside the tailgate assembly, wherein the control unit includes logic that, when executed by the processor, causes the processor to compare the first accelerometer signal to the third accelerometer signal to determine if the tailgate is in the lowered configuration.

3. The vehicle of claim 1, wherein the rear camera assembly comprises the first accelerometer.

4. The vehicle of claim 3, wherein the second accelerometer is a vehicle accelerometer that is used to measure acceleration of the vehicle.

5. The vehicle of claim 3 further comprising a front camera assembly located at a front of the vehicle, wherein front camera assembly comprises the second accelerometer.

6. The vehicle of claim 3, wherein the rear camera assembly comprises the processor.

7. The vehicle of claim 3, wherein the rear camera assembly comprises an actuator that is configured to move a rear video camera of the rear camera assembly to capture a first field of view with the tailgate assembly is in the raised configuration and a different second field of view when the tailgate assembly is in the lowered configuration.

8. A method of providing different fields of view using a rear camera assembly mounted to a tailgate assembly of a vehicle, the method comprising:
   comparing a first accelerometer signal from a first accelerometer located on the tailgate assembly to a second accelerometer signal from a second accelerometer mounted on the vehicle outside the tailgate assembly;
   determining if the tailgate assembly is in a raised configuration or a lowered configuration based on the step of comparing; and
   a control unit changing a field of view of the rear camera assembly as part of a reverse driving operation based on the step of determining;
   wherein the first accelerometer and second accelerometer providing a same accelerometer signal output direction for gravitational acceleration when the tailgate assembly in in the raised configuration and the first accelerometer providing a different acceleration output direction for gravitational acceleration than the second accelerometer when the tailgate assembly is in the lowered configuration due to change in orientation of the first accelerometer.

9. The method of claim 8 further comprising comparing the first accelerometer signal to a third accelerometer signal from a third accelerometer mounted on the vehicle outside the tailgate assembly.

10. The method of claim 8, wherein the control unit instructing an actuator to change the field of view of the rear camera assembly based on the step of determining.

* * * * *